(12) United States Patent
Rastegar et al.

(10) Patent No.: US 9,816,857 B2
(45) Date of Patent: Nov. 14, 2017

(54) METHODS AND DEVICES FOR USAGE OF SUNSCREEN LOTIONS

(71) Applicants: Jahangir S Rastegar, Stony Brook, NY (US); Harbans Dhadwal, Setauket, NY (US); Thomas Spinelli, Northport, NY (US)

(72) Inventors: Jahangir S Rastegar, Stony Brook, NY (US); Harbans Dhadwal, Setauket, NY (US); Thomas Spinelli, Northport, NY (US)

(73) Assignee: Omnitek Partners LLC, Ronkonkoma, NY (US)

( * ) Notice: Subject to any disclaimer, the term of this patent is extended or adjusted under 35 U.S.C. 154(b) by 258 days.

(21) Appl. No.: 14/284,760

(22) Filed: May 22, 2014

(65) Prior Publication Data

US 2015/0338272 A1    Nov. 26, 2015

(51) Int. Cl.
*G01J 1/42* (2006.01)
*G06T 7/00* (2017.01)
*G01J 1/02* (2006.01)
*G01J 1/04* (2006.01)
*G06T 7/90* (2017.01)

(52) U.S. Cl.
CPC .............. *G01J 1/429* (2013.01); *G01J 1/0233* (2013.01); *G01J 1/0271* (2013.01); *G01J 1/0488* (2013.01); *G06T 7/0012* (2013.01); *G06T 7/90* (2017.01); *G06T 2207/30088* (2013.01); *G06T 2207/30196* (2013.01)

(58) Field of Classification Search
CPC ........ G01J 1/429; G06T 7/408; G06T 7/0012; G06T 2207/30196; G06T 2207/30088

USPC ......................................................... 250/372
See application file for complete search history.

(56) References Cited

U.S. PATENT DOCUMENTS

| | | | |
|---|---|---|---|
| 7,500,746 B1 * | 3/2009 | Howell ................... | G02C 11/00 351/158 |
| 9,068,887 B1 * | 6/2015 | Bennouri ................ | G01J 1/429 |
| 2005/0285050 A1 * | 12/2005 | Bruce ...................... | G01J 1/50 250/474.1 |
| 2006/0289779 A1 * | 12/2006 | Marmaropoulos .... | G01D 21/00 250/372 |
| 2007/0269496 A1 * | 11/2007 | Gamble ................... | A61K 9/70 424/443 |
| 2008/0224059 A1 * | 9/2008 | Ferrero .................. | G01R 33/60 250/372 |
| 2008/0265170 A1 * | 10/2008 | Ales ....................... | A61B 5/0059 250/372 |

(Continued)

*Primary Examiner* — David Porta
*Assistant Examiner* — Gisselle Gutierrez

(57) ABSTRACT

A method for calculating a rate of UV radiation absorbed by a user's skin including: capturing image data of an area of the user's skin; determining a skin tone of the user's skin based on the captured image data; calculating a rate of UV radiation absorption for the determined skin tone; measuring an amount of UV radiation exposed to the user's skin; and calculating a rate of UV radiation that would be absorbed by the user's skin based on the user's skin tone and the amount of UV radiation exposed to the user's skin. The method can further comprise calculating an amount of time that the user can be exposed to the amount of UV radiation exposed to the user's skin based on predetermined criteria. The predetermined criteria can at least include an SPF level of sunscreen applied to the user's skin.

11 Claims, 8 Drawing Sheets

(56) References Cited

U.S. PATENT DOCUMENTS

| | | | |
|---|---|---|---|
| 2010/0163750 A1* | 7/2010 | Hunwick, III | G01K 11/12 |
| | | | 250/474.1 |
| 2011/0300572 A1* | 12/2011 | Dueva-Koganov | G01N 33/15 |
| | | | 435/29 |
| 2012/0326046 A1* | 12/2012 | Aslam | G01J 1/0233 |
| | | | 250/372 |
| 2014/0118987 A1* | 5/2014 | Li | F21S 8/006 |
| | | | 362/2 |
| 2015/0041663 A1* | 2/2015 | Oliver | G01J 1/0219 |
| | | | 250/372 |
| 2015/0125406 A1* | 5/2015 | Cassou Blaison | A61K 8/347 |
| | | | 424/59 |
| 2015/0169981 A1* | 6/2015 | De Guia | A61B 5/441 |
| | | | 382/190 |
| 2015/0177063 A1* | 6/2015 | Lian | G01J 1/0403 |
| | | | 250/372 |
| 2015/0241273 A1* | 8/2015 | Aslam | G01J 1/429 |
| | | | 250/372 |

\* cited by examiner

METHODS AND DEVICES FOR USAGE OF SUNSCREEN LOTIONS

BACKGROUND OF THE INVENTION

1. Field of the Invention

The present invention relates to methods and devices for the user specific usage of sunscreen lotions and in particular, methods and devices for alerting a user with a given skin tone of the generally safe length of time to stay in the sun given the amount of ultraviolet ("UV") radiation present and the SPF value of the sunscreen lotion or for a SPF value of the sunscreen being used how long it is safe to stay under the sun with a given UV radiation level for the user skin tone.

SPF stands for "Sun Protection Factor" and refers to the theoretical amount of time you can stay in the sun without getting sunburned. For example, an SPF of 15 would allow you to stay in the sun 15 times longer than you could without protection.

Furthermore, "sunscreen" for purposes of this disclosure, means any lotion disposed on the skin and used in the sun to reduce the amount of UV radiation reaching the treated surface that would otherwise reach without such lotion.

Still further, although the description is written in terms of the sun being the source of UV radiation, other sources are possible, such as sun lamps.

2. Prior Art

In just the last generation, people have become more aware of the dangers of the sun, including aging of the skin, unsightly blemishes, wrinkling, and of course, cancers. All of these dangers have in common the exposure of too much UV radiation from the sun, usually resulting in a sunburn. A sunburn is reddening (and possibly inflammation) of the skin that occurs after you are exposed to the sun or other UV light. A sunburn can range in severity from a first degree burn where the skin is pink to bright red and painful, to a second degree burn where the skin is blistered, to a third degree burn where deep cell damage occurs to the skin and nerve endings can be destroyed. Over exposure to UV radiation from the sun can also result in heat stroke and sun-poisoning.

However, people are still constantly burned by the UV rays of the sun, even those wearing sun-screen lotions. Sunscreen lotions have been developed with varying levels of protection from UV radiation. As discussed above, these lotions are given an SPF level, which is the theoretical amount of time you can stay in the sun without getting sunburned. The problem of burning, for those without a sunscreen is obvious, over exposure to harmful UV radiation of the sun (or even a sun lamp). However, even those that use a sunscreen can also be burned because they are not using the proper SPF. These people use the same SPF regardless of factors that affect the amount of exposure they receive on any given day/time, such as their skin tone and the strength of the UV rays that they are being exposed to.

SUMMARY OF THE INVENTION

Accordingly, a method for calculating a rate of UV radiation absorbed by a user's skin is provided. The method comprising: capturing image data of an area of the user's skin; determining a skin tone of the user's skin based on the captured image data; calculating a rate of UV radiation absorption for the determined skin tone; measuring an amount of UV radiation exposed to the user's skin; and calculating a rate of UV radiation that would be absorbed by the user's skin based on the user's skin tone and the amount of UV radiation exposed to the user's skin.

The method can further comprise calculating an amount of time that the user can be exposed to the amount of UV radiation exposed to the user's skin based on predetermined criteria. The predetermined criteria can at least include an SPF level of sunscreen applied to the user's skin. The measuring can comprise measuring the amount of UV radiation exposed to the user's skin as reduced by the SPF level of sunscreen.

The method can further comprise calculating a required sunscreen SPF level for a predetermined exposure time.

Also provided is a method for calculating a SPF level of sunscreen lotion. The method comprising: (a) measuring an amount of UV radiation from a radiation source using image data of the UV radiation source with a non-UV spectrum filter disposed between an image sensor for capturing the image data and the non-UV spectrum filter; (b) covering a test filter with the sunscreen lotion and repeating step (a) with the test filter in place of the non-UV spectrum filter; and (c) calculating the SPF of the sunscreen lotion based on the results of steps (a) and (b).

The calculating can be a ratio of the results from steps (a) and (b).

Still further provided is a container comprising: a body forming an enclosure, the body having an open end in fluid communication with the enclosure; a cap for releasably covering the opening; sunscreen lotion having an SPF factor disposed in the enclosure; and a filter releasably connected to the body, the filter having optical properties characteristic of the sunscreen in the enclosure.

The container can further comprise a label adhered to an outer surface of the body, wherein the filter is at least a portion of the label. The label can comprise perforations separating the filter from other portions of the label. The label can further comprise a tab for facilitating removal of the filter form the label along the perforations.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

Figure 1A:
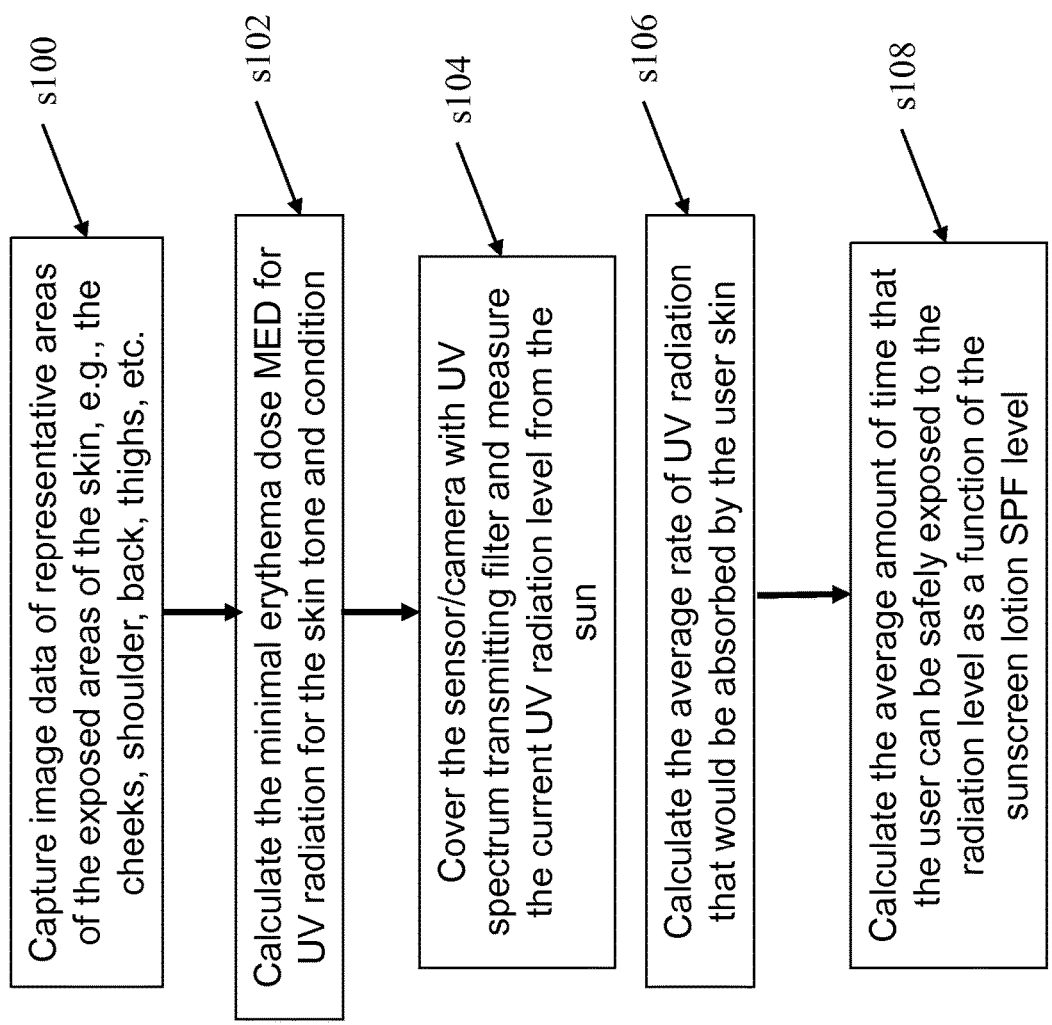
FIG. 1A illustrates a flow chart of an embodiment of a method for usage of sunscreen.

Referring first to FIG. 1A, there is illustrated a flow chart of a method for calculating an average amount of time that a user can be exposed to a UV radiation level. The method includes a step s100 of taking digital image data of areas of the skin. The areas of the skin can be representative of areas of exposed skin, such as the cheeks, shoulders, back, thighs, stomach, etc. These areas are representative of the user's current skin tone levels, which may include previous sun exposure, i.e., tanning. However, the user may also use unexposed skin areas, such as those typically covered by clothing, which are more representative of the user's natural skin tone. The natural skin tones may vary the result of the method of FIG. 1A such that less exposure time is recommended.

Figure 4B:
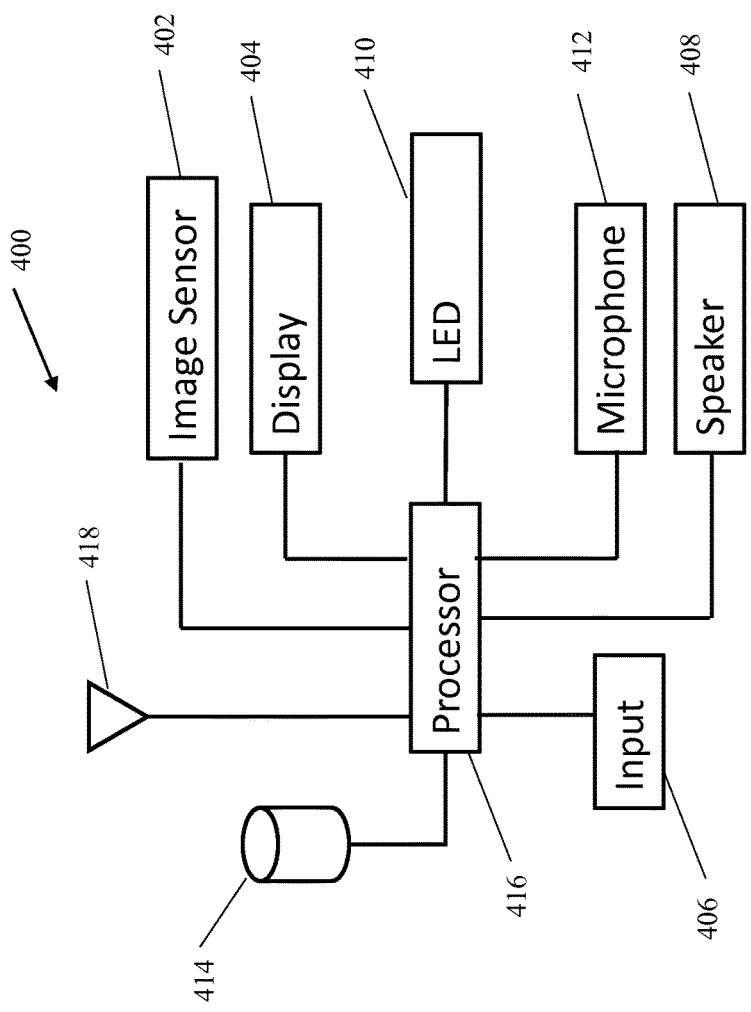
FIG. 4B illustrates a schematic representation of the device of FIG. 4A.
Figure 4A:
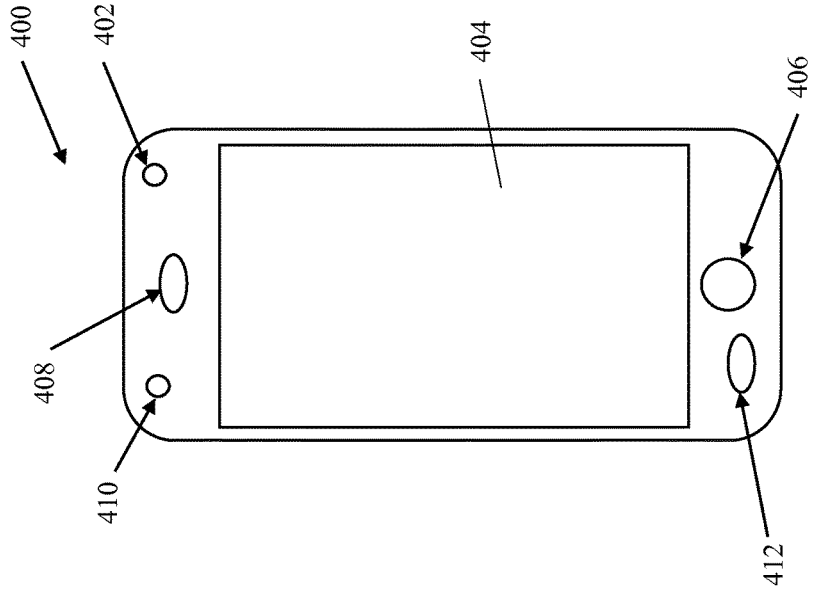
FIG. 4A illustrates a device for use in the methods of FIGS. 1, 2 and/or 3.

Referring briefly to FIG. 4, there is illustrated a device 400 suitable for capturing the digital image data in step s100. Although a digital camera may be used for capturing such image data, such image data would then need to be uploaded to a device having a processor 416 (at least a portion of which comprises hardware) for carrying out other step(s) of the methods disclosed herein. Therefore, the device 400 can be of a type that includes both an image sensor (e.g., digital camera) and a processor to avoid having to transfer the image data/digital images from a first device capturing the image data and a second device processing such data. In FIG. 4, such device is represented as a smart phone, having an image sensor/digital camera 402 and an internal processor 416. Other devices having a similar configuration can also be used. Although such devices do not have to be portable, portability is helpful, such as being used at the place of exposure to the UV radiation, such as the beach, park, playground, outdoor workplace, etc. The smart phone device 400 further typically includes a wireless connection to the internet, such as a cellular and/or wireless link; a Bluetooth wireless connection to other devices (the wireless connection being generally illustrated as transceiver 418), memory 414, a display 404, a speaker 408, an illuminating light, such as an LED 410, a microphone 412 and one or more input devices, such as buttons 406 and the display 404 being a touch screen for controlling the device 400. The device 400 generally includes software residing in the memory 414 for running applications, such as the methods disclosed herein. However, all or some of the software steps can be carried out by software residing remotely from the device 400, such as a remote server accessed through the wireless connection 418.

Returning now to FIG. 1A, at step s102, the image data captured at step s100 is analyzed and the rate of UV radiation absorption for the particular skin tone and condition in the image data is calculated. If more than one image is used in the analysis or if the skin tone varies within a single image, an average rate of UV radiation for the skin tone is calculated. Step s102 measures the skin type while step s104 measure the UV irradiance $E_R$ (W.m$^{-2}$). The maximum permissible exposure (MPE) expressed J.m$^{-2}$ will be a function of the skin type, darker skin levels having higher values. The minimal erythema dose (MED) has been found to be a good predictor of assessing the risk of photo damage and skin cancer. These values range from 200 J.m$^{-2}$ to 1000 J.m$^{-2}$ for white to black skin tones, respectively.

The Fitzpatric Scale defines seven skin types in terms of their severity to burn in the presence of UV exposure. Type I always burns and never tans, whereas Type VI, which is deeply pigmented dark brown to black, never burns but tans easily. The Fitzpatrick scale is a numerical classification scheme for determining the skin color based on a questionnaire related to an individual's genetic constitution, reaction to sun exposure, and tanning habits. For example, Type I has a numerical score in the range 0 to 6, whereas score is greater than 35 for skin type VI. The skin type can be determined based on the natural light photograph taken with the device 400, such as the smart phone camera 402. Image sensors, typically, use a 24 bit word, 8 bits per color to represent the RGB value of each pixel. For example, black is (0,0,0) corresponding to a numerical value of 0, and white is (255,255,255) giving a numerical value of 16581375. A look-up table of the 7 shades of skin color from white to black can be defined by a RGB vector (R,G,B). For example, dark brown skin (Type IV) is (51,25,0) while light brown (Type III) is (102,51,0).

At step s104, a UV transmitting spectrum filter is used to cover the image sensor/camera 402 of the device 400. The filter can be a low-pass filter with a cut-off wavelength of 400 nm. The sensor/camera is then directed towards the sun and an image is captured. The internal processor 416 of the device 400 is then used to calculate the sun UV radiation level for the time of the day, weather conditions, etc. In general, the sensor/camera 402 needs to be calibrated for the UV radiation level measurement, particularly when a camera is used instead of a calibrated UV radiation level sensor for such measurements since most camera image sensors are coated with filters to filter a portion of the UV radiation.

Then, as indicated in the flow chart of FIG. 1A, at the step s106, using the estimated rate of UV radiation absorption for the user skin tone and condition (step s102) and the measured UV radiation level at the user location (step s104), the processor 416 of the device 400 calculates the average rate of UV radiation that would be absorbed by the user's skin. The processor 416 of the device 400 then calculates the average amount of time that the user can be safely exposed to the radiation level at that time as a function of the sunscreen lotion SPF level. The information can then be displayed for the user on the display 404, preferably in a user selected format, for example in a table, graph, pictorial, verbally, or the like manner.

According to FDA guidelines (21 CFR 1040.20), developed for sunlamp manufacturers, the maximum recommended exposure time should not exceed a value which will result in an exposure of four times the minimal erythema dose (MED) for untanned Type II skin (always burns, then tans slightly). This is based on the CDRH Erythema Action Spectrum [proposed action spectrum of Commission Internationale de L'Eclairage (CIE) modified by CDRH]. The formula for the maximum recommended exposure time $T_e$ is given by $$T_e[\text{seconds}] = \frac{624[\text{J.m}^{-2}]}{\sum V_i E_i}$$

where Standard MED=156 J.m$^{-2}$ at 290 nm, $V_i$ is the spectral weighting factor and $E_i$ the irradiance in W.m$^{-2}$. Using the direct circumsolar spectrum (ASTM G173-03 reference spectrum), $T_e$=2500 seconds.

The recommended maximum exposure time should not exceed a value which will result in an exposure of four times the minimal melanogenic dose (MMD) for untanned Type II skin. This is based on the melanogenic action spectrum. The formula for determining the recommended exposure time $T_m$ is given by, $$T_m[\text{seconds}] = \frac{1836[\text{J.m}^{-2}]}{\sum J_i E_i}$$

where the Standard MMD=459 J.m$^{-2}$ at 296 nm and J$_i$ is spectral weighting factor. Using the direct circumsolar spectrum (ASTM G173-03 reference spectrum), T$_m$=7503 seconds.

The exposure times calculated above are for untreated skin, and can be multiplied by SPF to give the extended exposure time for treated skin.

In the above description of step s108, the estimated amount of time that the user may at the time be safely exposed to the existing level of UV radiation is calculated as a function of the sunscreen lotion SPF level and the information transmitted to the user via one or more of the indicated means. It is, however, appreciated by those skilled in the art that the estimated exposure time period information may be calculated and transmitted based on different user input information. For example, the user may already have a sunscreen with a known SPF level. The user can then enter the information into the device 400 at the time of use and at step s108, the user will be provided with the estimated amount of time that the user may be safely exposed to the existing level of UV radiation. The time period and possibly the time period for different sunscreen lotion SPF levels may then be transmitted using one of the aforementioned means as preferably selected by the user. The software provided to the device 400 and either residing in the memory 414 or in a remote server and accessed wirelessly can contain a default mode for presenting the estimated safe exposure time period.

One method of transmitting the information about the estimated amount of time that the user may be safely exposed to the existing level of UV radiation is by indicating the estimated numbers of hours and minutes on the display 404 of the device 400, and possibly with a countdown to zero. Alternatively, the time of the day at which the safe exposure period will expire may be displaced and/or set into the device 400 alarm clock. Alternatively one or more of the above methods alone or in combination with other displaced images and/or audio sounds or instructions or the like may be used. The user would have the option of selecting the desired method or utilize the default option, which can be the displayed time of the day at which the exposure is suggested to end as well as the alarm signal being sounded. The processor can also initiate a timer based on the result and display the same on the display 404 of the device 400 and further indicate one or more warnings on the speaker 408 for when the time expires or warnings, which can be set by the user, for when a predetermined amount of time remains before the time expires.

Figure 2:
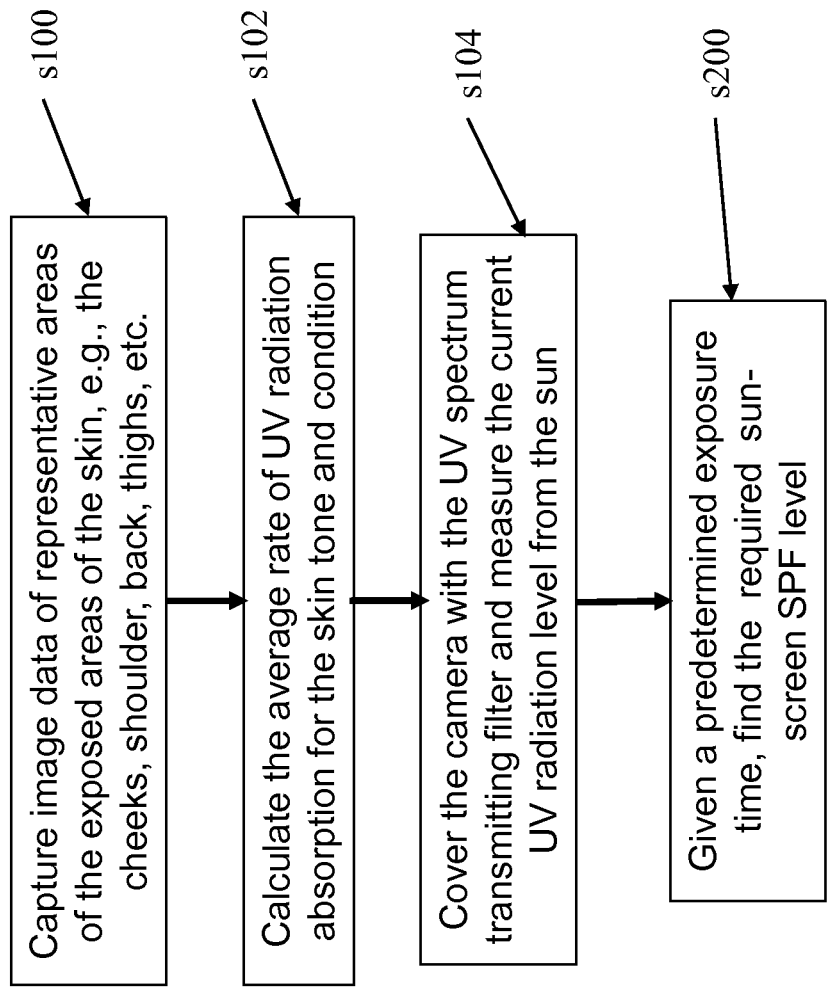
FIG. 2 illustrates a flow chart for another embodiment of a method for usage of sunscreen.

Referring to FIG. 2, there is illustrated a flow chart of another method for calculating an average amount of time that a user can be exposed to a UV radiation level. In this method, following the steps s100, s102 and s104 described previously, at the step s200, based on the calculated average rate of UV radiation absorption for the user skin tone and condition (step s102) and the measured level of the UV radiation from the sun at the time of the day, and based on the amount of exposure time indicated by the user (as entered by the user into the device 400, FIG. 4), the processor 416 of the device 400 can calculate the required minimum sunscreen SPF level that should be used for protection from UV radiation (step s200 in FIG. 2).

Figure 1B:
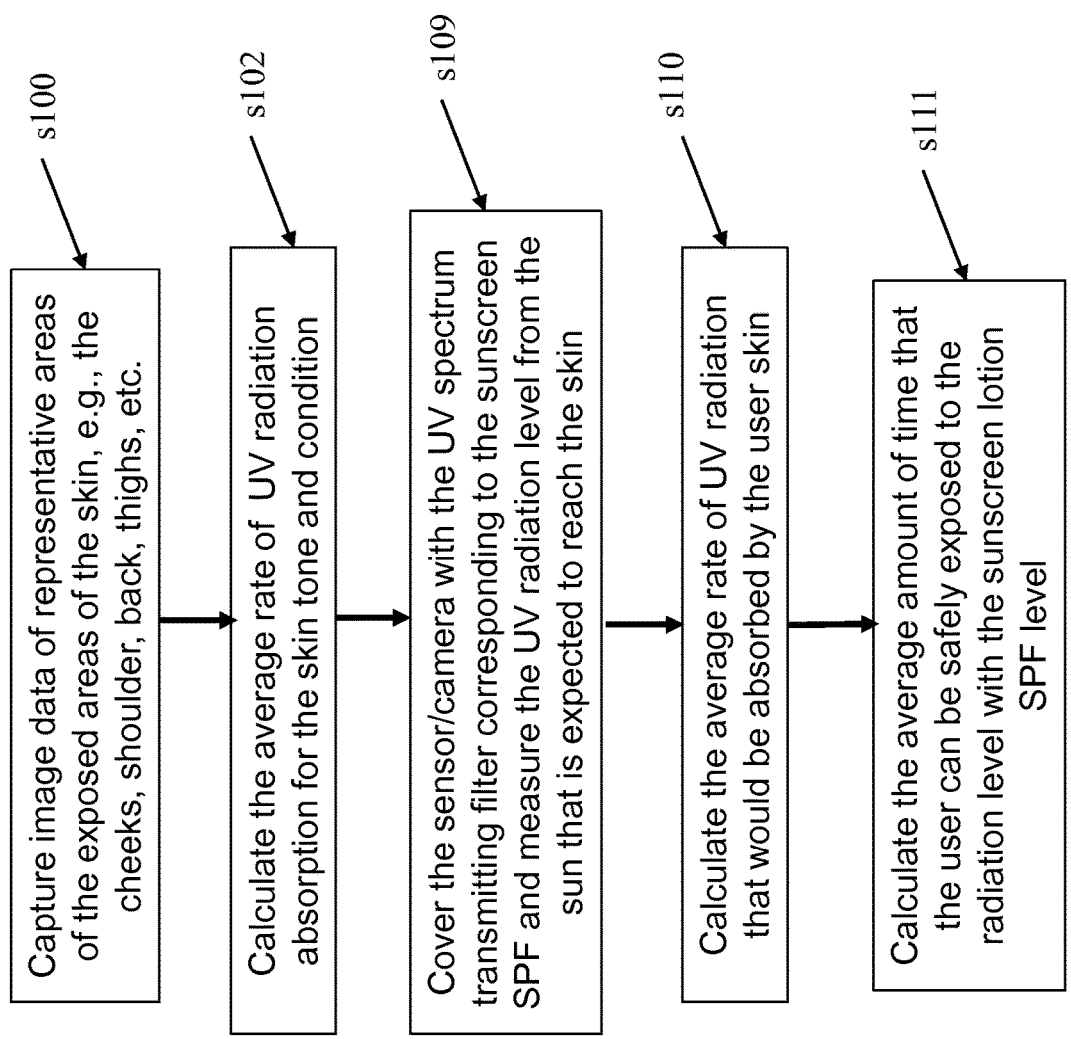
FIG. 1B illustrates a flow chart of an alternative embodiment of the method for usage of sunscreen of FIG. 1A.

In an alternative embodiment, the filter used at the step s104, FIG. 1A, is representative of the sunscreen lotion SPF level. The flow chart of this alternative method for calculating an average amount of time that a user can be exposed to a UV radiation level is illustrated in FIG. 1B. In the method of FIG. 1B, after the step s102, in step s109 (replacing step s104 of FIG. 1A), the sensor/camera 402 of the device 400, FIG. 4, is covered with a spectrum filter corresponding to the SPF of the sunscreen to be used and the sensor/camera 402 is directed towards the sun and an image is captured. The internal processor 416 of the device 400 is then used to calculate the level of UV radiation that the selected sunscreen SPF would allow to be absorbed by the user skin at that time of the day, weather conditions, etc. In general, the sensor/camera 402 needs to be calibrated for the UV radiation level measurement, particularly when a camera is used instead of a calibrated UV radiation level sensor for such measurements since most camera image sensors are coated with filters to filter a portion of the UV radiation.

Then, as was described for step s106 of the flow chart of FIG. 1A, at step s110 and using the estimated rate of UV radiation absorption for the user skin tone and condition (step s102) and the measured UV radiation level reaching the user skin covered with the selected sunscreen lotion with the SPF level (step s109), the processor 416 of the device 400, FIG. 4, calculates the average rate of UV radiation that would be absorbed by the user skin. Then at step s111, the processor 416 of the device 400 will calculate the average amount of time that the user can be safely exposed to the radiation level at that time with the selected sunscreen lotion SPF level. The information can then be displayed for the user on the display 404, preferably in the user selected format, for example in a table, graph, pictorial, verbally, or the like manner.

The user can use such time to determine how long he/she will remain exposed to the UV radiation or repeat steps s109-s111 for another SPF level. The processor can also initiate a timer based on the result and display the same on the display 404 of the device 400 and further indicate one or more warnings on the speaker 408 for when the time expires or warnings, which can be set by the user, for when a predetermined amount of time remains before the time expires or employ any other aforementioned methods and means of providing the said safe exposure timing information to the user.

Figure 5:
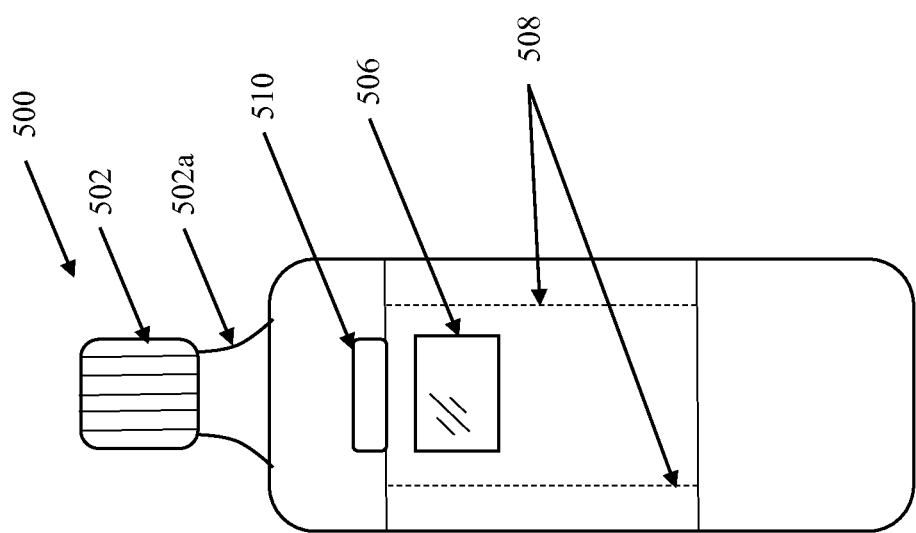
FIG. 5 illustrates a bottle of sunscreen having a removable filter for use in the methods of FIGS. 1 and/or 3.

Referring to FIG. 5, there is illustrated a bottle of sunscreen lotion 500 having a cap 502 for containing the lotion in an interior of the bottle 500. The bottle may also have a label 504 in which a portion 506 is a filter representative of the SPF level of the lotion contained in the bottle 500. The filter 506 can be separated from the label 504 by perforations 508 and a tab 510 that can be grasped by the user to facilitate removing the filter 506 from the label 504 by tearing the perforations 508. Alternatively, the filter 506 can be attached to the bottle by hanging it around the bottle neck 502a or merely releasably adhering the filter to the bottle 500.

Figures 6, 7:
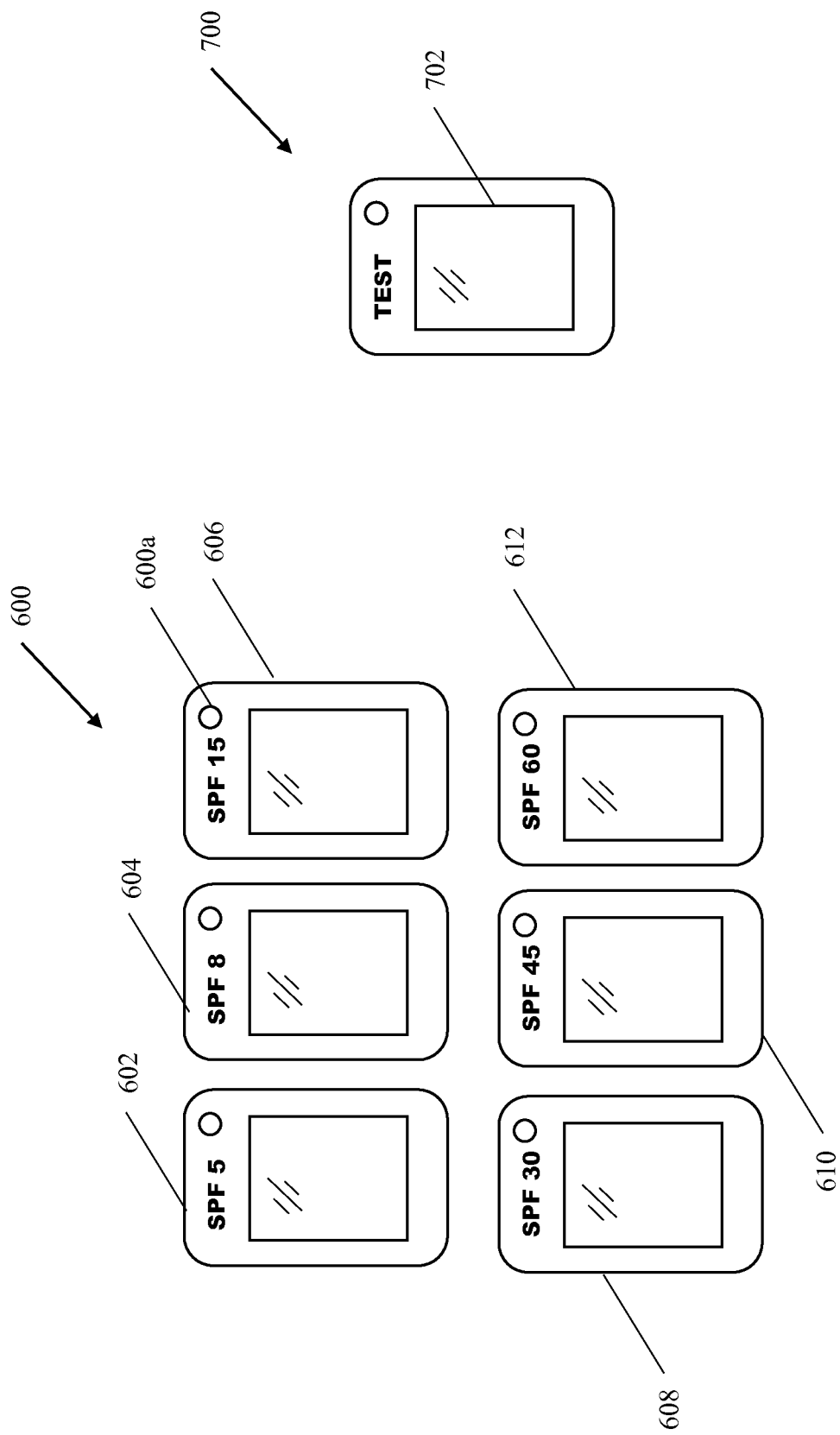
FIG. 6 illustrates a plurality of filters for use in the method of FIG. 1.
FIG. 7 illustrates a test filter for use in the methods of FIGS. 1 and/or 3.

Referring now to FIGS. 6 and 7, alternatively, one or more of a plurality of filters 600 or a test filter 700 can also be used in Step s104. With regard to FIG. 6, if the sunscreen lotion manufacturer does not provide a filter, a filter can be selected from a plurality of filters 600 corresponding to the SPF of the sunscreen to be used. Such plurality can include filters corresponding to an SPF 5 (filter 602), SPF 8 (filter 604), SPF 15 (filter 606), SPF 30 (filter 608), SPF 45 (filter 610) and SPF 60 (filter 612). Such filters 602-612 are by way of example only, more or less can be provided and in the same of different SPF levels. Also, such plurality of filters 600 can be provided on a key ring (not shown), rivet, etc., such as by passing a portion thereof into a hole 600a on each filter so that they are compact and each one can be individually accessible for use with the image sensor/camera 402. If the user intends to use an SPF 15 lotion, he/she would select a filter 606 corresponding to SPF 15 at step s104. Alternatively, the user can select a filter corresponding to a random SPF, obtain the results and determine if the results are acceptable. If not, the user can select another filter from the plurality of filters 600 and repeat the method until the results are acceptable.

Referring now to FIG. 7, the body 702 of the filter 700 can be optically transparent and not include any filtering of UV radiation. However, a film of sunscreen can be applied thereto and the method conducted at step s104 with such filter. In this case, the actual SPF value of the sunscreen will be used in the method instead of a representative filter.

Figure 3:
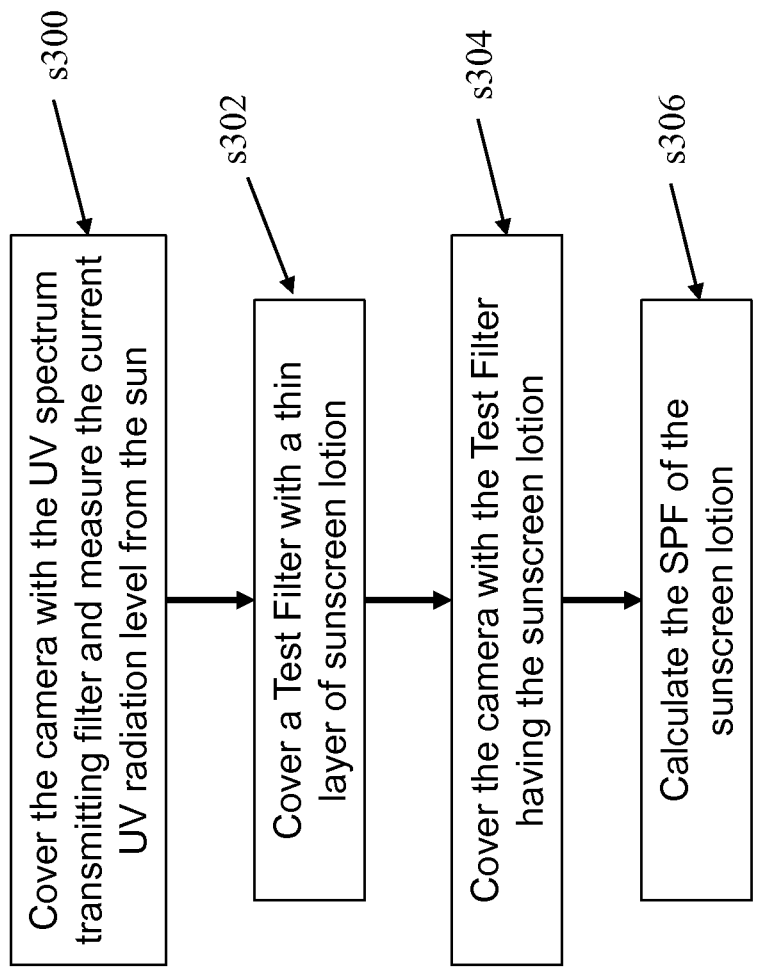
FIG. 3 illustrates a flow chart for a method of checking an SPF level of a sunscreen, possibly for use in the methods of FIGS. 1 and/or 2.

When the user is not sure about the SPF indicated on a sunscreen lotion bottle, then the user may choose to measure the SPF of the sunscreen lotion. To this end, the user can follow the steps provided in the flow chart of FIG. 3. The user will first smear a small amount of sunscreen lotion on a blank "filter" 700 (step s302) and check the amount of UV radiation with (step s304) and without (step s300) the test filter to see how much is blocked by the filter to arrive at an SPF of the sunscreen lotion (step s306). It is appreciated by those skilled in the art that the surface of the blank test filter can be relatively absorbent of the sunscreen lotion to the level of average human skin in normal conditions. The SPF factor X can be calculated by taking a ratio of the measured irradiance with and without the sun screen applied, provided the two measurements are done with the same camera settings, or with knowledge of the camera settings, which should be accessible through the raw image (or DNG file format).

It is appreciated by those skilled in the art that since the level of UV radiation received from the sun at a given location is dependent on the time of the day, weather conditions and the time of the year, when a user intends to expose certain region(s) of his/her skin to the sun UV radiation for a relatively long period of time, then for any one of the aforementioned embodiments, the processor 416 of the device 400 may account for such variation of the UV radiation for the said time period. This can be done by using a stored table in the memory 414 indicating such data, and/or by acquiring such data from a provided server via internet or other wireless connection, or by using a stored table and the current weather conditions acquired through the internet or the user or other available sources. Alternatively, the program (application) provided either in the memory 414 on the device 400 or acquired wirelessly may periodically alert the user to make UV level measurement, i.e., repeat the step s104 of FIGS. 1A and 3 or s109 of FIG. 1B, and update to safe time duration for exposure accordingly based on total accumulated level of UV radiation exposure. Accumulated effects of UV exposure on any part of the exposed skin are assessed by comparing the archived images captured in step s100. Typically, the images will be segmented into small areas for comparison. Appearance of localized spots will be early indicators for increased risk to skin melanoma.

It is also appreciated by those skilled in the art that the program (application) provided on the device 400 may be used to alert the user periodically to apply another coat of sunscreen lotion depending on the weather condition and/or the time elapsed from the last sunscreen lotion application and/or depending on various activities such as swimming provided by the user and other similar events and conditions such as playing in sand, sweating, and the like.

Figure 8:
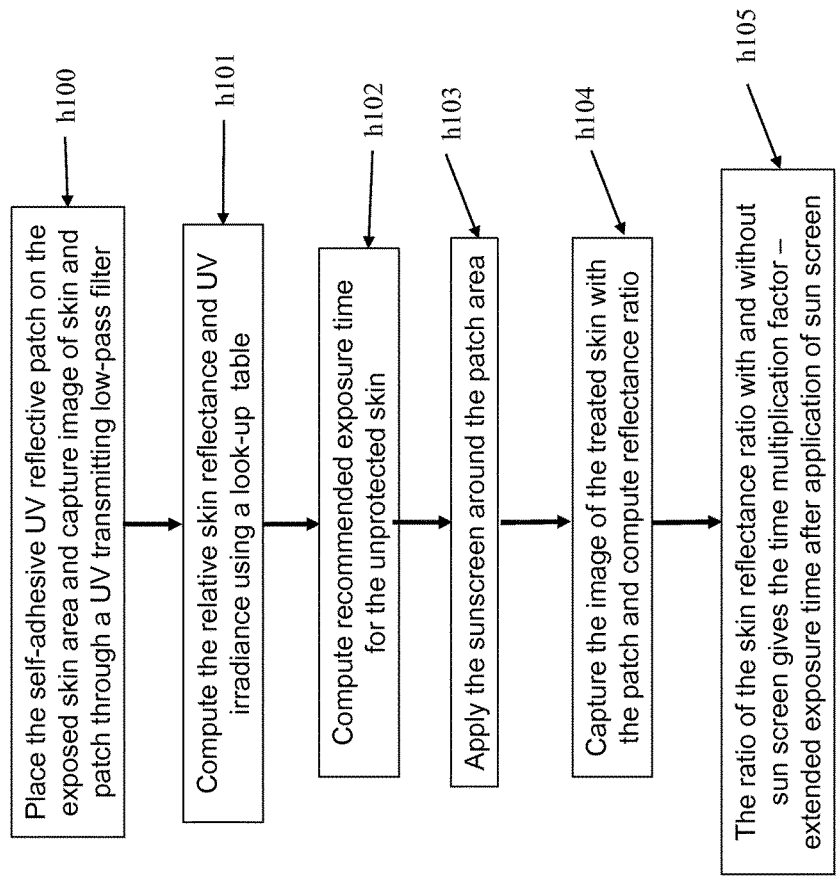
FIG. 8 illustrates a flow chart of an alternative embodiment of a method for usage of sunscreen.

Another embodiment, illustrated in FIG. 8, shows a flow chart of a method for calculating an average amount of time that a user can be exposed to a UV radiation level. The method includes a step h100 of placing a UV reflective patch on the surface of the skin area intended to be exposed to UV radiation (of the sun or other UV radiation source). The areas of the skin can be representative of areas of exposed skin, such as the cheeks, shoulders, back, thighs, stomach, etc. These areas are representative of the user's current skin tone levels, which may include previous sun exposure, i.e., tanning. However, the user may also use unexposed skin areas, such as those typically covered by clothing, which are more representative of the user's natural skin tone. An image of the UV patch and surrounding area is captured at step h100. The UV reflective patch can be nearly centered in the captured image. Step h102 computes the average UV irradiance at the skin surface from the measured average reflectance signal from the UV patch, and a priori knowledge of a reflection coefficient of the UV patch in the UV spectrum of solar radiation. Further, the reflectance signal from the skin region is normalized using the UV patch signal. This normalized value is representative of the skin tone. For example, a value close to zero indicates white skin tone whereas a value close to unity indicates a dark skin tone, reflecting most of the incident UV illumination.

Using the UV irradiance computed in step h102, the recommended exposure time $T_m$ for the unprotected skin can be calculated using above referenced equations. The next step h103 applies the sun screen to skin areas surrounding the UV patch. Step h104 calls for capturing the image of the treated skin and UV patch through the same UV low pass filter described in step h100. Step h104 also repeats the normalization sequence outlined in step h102, giving a normalized reflectance value for treated skin. In step h105, the ratio of the normalized reflectance values for treated and untreated skin is calculated giving the time extending factor X of the screen protection cream (SPF X). The modified safe exposure time with the treated skin is X times the exposure time in step h102.

Another further feature of the method of FIG. 8 is the capability to archive the image captured from unexposed areas of the skin to use as a baseline measurement for assessing the accumulated effects of the exposed areas over the person's life time. This data would be valuable in providing information on the early stages of skin melanoma.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:
1. A method comprising:
applying a patch to a portion of the user' skin, the skin being unprotected against an ultraviolet (UV) spectrum of a radiation source, the patch having a predetermined reflection coefficient in the UV spectrum of a radiation source;
capturing a first image data of the patch applied to the user's skin, the first image data including an area of the user's unprotected skin adjacent to the applied patch;

measuring a first reflectance from the patch based on the predetermined reflection coefficient;

determining a second reflectance from the unprotected skin adjacent to the applied patch based on the measured first reflectance;

applying a sunscreen on the user's unprotected skin;

capturing a second image data of the user's skin, the second image data including an area of the user's skin with the applied sunscreen;

determining a third reflectance from the skin adjacent to the applied patch for the skin having the applied sunscreen based on the measured first reflectance;

determining a time extending factor for the applied sunscreen based on the second and third reflectance.

2. The method of claim 1, wherein the radiation source is a solar radiation source.

3. The method of claim 1, wherein the applying of the patch to the user's skin comprises adhering the patch to the skin.

4. The method of claim 1, wherein the applying applies the patch to a portion of an unexposed portion of the user's skin representative of the user's natural skin tone.

5. The method of claim 1, wherein the applying applies the patch to a portion of a previously exposed portion of the user's skin.

6. The method of claim 1, further comprising determining an exposure time for the unprotected skin.

7. The method of claim 6, wherein the exposure time, $T_m$, in seconds, for the unprotected skin is determined based on the following equation:

$$T_m[\text{seconds}] = \frac{1836[J \cdot m^{-2}]}{\sum J_i E_i}$$

where the Standard MMD=459 J.m$^{-2}$ at 296 nm and $J_i$ is spectral weighting factor.

8. The method of claim 6, subsequent to the comparing, calculating an exposure time for the user's skin with the applied sunscreen by multiplying the time $T_m$ by the time extending factor.

9. The method of claim 1, wherein the capturing of the first and second image data is captured through a UV transmitting low-pass filter.

10. The method of claim 1, further comprising saving at least the first image data with an associated date of capture.

11. The method of claim 1, wherein the determining of the time extending factor for the applied sunscreen is a ratio of the second and third reflectance.

* * * * *